Jan. 2, 1940.  J. E. C. DE V. PEREIRA  2,185,924
PROCESS OF MAKING RELIEF MAPS
Filed Jan. 4, 1937
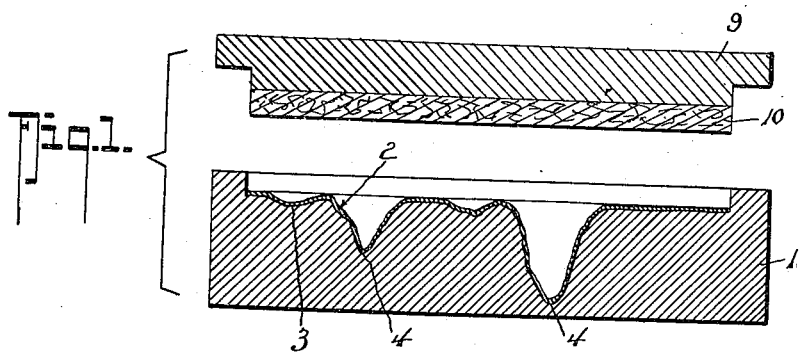
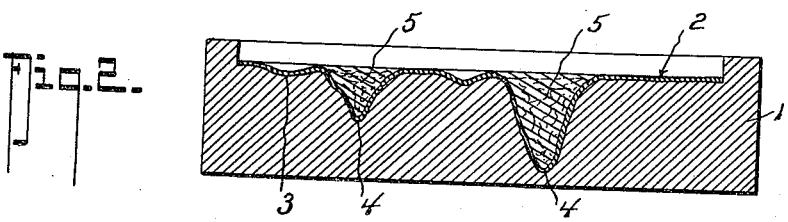
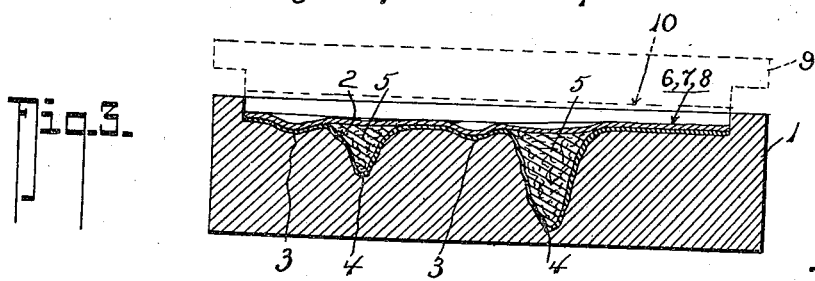
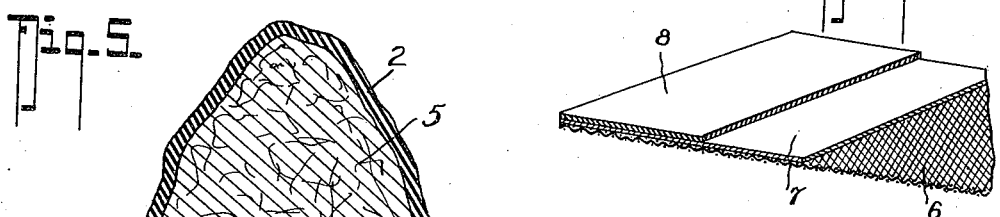
Inventor
Jose Estevao Cacella de Victoria Pereira
By B. Singer
Attorney Patented Jan. 2, 1940

2,185,924

UNITED STATES PATENT OFFICE

2,185,924

PROCESS OF MAKING RELIEF MAPS

Jose Estevão Cacella de Victoria Pereira, Lisbon, Portugal

Application January 4, 1937, Serial No. 119,032

2 Claims. (Cl. 18—55)

The invention relates to the art of relief maps and map making, etc., and it particularly has for its object to provide a map in high relief which will be flexible, durable, and which may be folded, rumpled and subjected to moisture without permanent damage during a relatively long life.

Further, the invention resides in a particular method of manufacturing high-relief maps so that such maps will possess the qualities above referred to.

Again, it is an object of the present invention to provide high-relief maps, etc., which are especially useful for military purposes in that they may be folded, rolled or crumpled without tearing or becoming seriously or permanently damaged, and which can be wet without damaging the same.

In the drawing:

Figure 1 is a vertical section through a mold and counter mold by using which the process may be carried out (the first step of the process being taken).

Figure 2 is a vertical section of the mold, the second step of the process having been carried out.

Figure 3 is a vertical section of the mold with the step of the process carried out to the point where the content is ready for vulcanization.

Figure 4 is a perspective view of the textile fabric showing, diagrammatically by broken parts, the way it is prepared before placing it in the mold.

Figure 5 is a magnified cross section of a portion of the finished map showing in detail the constituents thereof.

In the drawing, I represents a metallic mold, preferably of aluminum, in which, by casting process or by use of the mechanical pantograph, the contours of the area to be mapped are formed in negative relief, some indentations 3 being shallow, and others 4 being of relatively great depth, as the case may be. A plunger 9, preferably with a felt or rubber facing 10 may be provided to fit within the mold 1, if desired, as will later appear. The plunger 9 may be of the nature of a counter mold, but need not be provided with the relief nodes, such as are usually employed when molding a body of uniform thickness (see Figs. 3 and 4 of U. S. Pat. 878,308 for the usual counter mold) since the plunger 9 need serve no molding (forming) function when the present method is employed.

The names of places, objects and other planimetric details are, of course, engraved in the usual manner.

The process of manufacture may be carried out with the molds either hot or cold, but I prefer to use the mold heated to a temperature of from 60° to 70° centigrade. When the hot mold is used I employ a compound of latex in liquid condition, preferably of the following formula:

| | | |
|---|---|---|
| Latex | litres | 1.67 |
| Oxide of zinc | grams | 80 |
| Accelerator | do | 8 |
| Sulphur | do | 15 |

If a cold mold is used, I add to the above a suitable quantity of a suitable paste having an acid base intended for rapid coagulation, such for example as

| | Grams |
|---|---|
| Oxide of zinc | 1.000 |
| Water | 300 |

We dissolve this paste in the following solution and we mix in the latex:

| | Grams |
|---|---|
| Water | 1.000 |
| Acetic acid | 50 |

The latex liquid formula is sprayed over the surface of the mold cavity by means of an aerograph pistol to deposit a relatively thin layer or film 2 over the surfaces of the mold cavity. This film is then permitted to dry. After the film or layer 2 has dried sufficiently I dust its exposed surface lightly with talc powder.

While the layer 2 is drying I prepare the backing for the layer 2 by taking a sheet of textile fabric such, for example, as a cotton sheet, canvas, or linen, preferably of light weight, and apply to one face thereof a layer or film of meal or starch paste or glue. After the glue has dried, I spray over the glue a thin film of dilute latex and as soon as possible thereafter I place the sheet in the mold with the latex side down on the dried film 2 of latex in the mold. Before doing this, however, I preferably fill the deep depressions with a loose textile fibre, such as raw cotton 5, or with loose felt fibre, which prevents collapse of the high relief portion of the map and makes it unnecessary to mold the prepared fabric sheet 6—7—8 to conform to the various depths and contours of the face of the map constituted by the film 2.

The prepared fabric sheet is caused to adhere to the face layer 2 by applying a brush over the back of the fabric sheet to press it into contact with the surface below, or a plunger 9 may be used for the purpose of pressing the parts together.

The mold is then heated to a temperature of about 100° to 110° C. for about twenty minutes, by which time vulcanization will be sufficiently completed for the caoutchouc to remain in stable condition.

Instead of vulcanizing the article while in the mold, it may be removed and placed in a suitable vulcanizing oven.

It is not necessary to place the mold and plunger in a press; one may simply place plunger 9 in mold 1 and tap it a few times with a mallet or other suitable device to cause cohesion between the latex on the prepared fabric and the latex of film 2. The meal or starch glue on the fabric 6 prevents the latex 8 from passing through the mesh of the fabric and sticking to the brush or plunger, as the case may be, and prevents the map when rolled up from sticking together.

Before spraying the latex over the mold surface, I may apply to the names and other planimetric details to be colored, by any suitable means—by a fine brush, for example—a suitable liquid dye or flexible elastic paint in liquid form. The general coloring of the article to give the natural colors to the ground, cultivated or uncultivated, the seas, and objects on the land and sea, is done by applying liquid dye or paint forcibly to the surface of the caoutchouc by means of an air-pressure paint gun or aerograph pistol after the article is removed from the mold. A set of forms, each having a portion cut away to correspond to the particular part to be colored, may be used as marks or stencils over the map or model while applying the dye or paint with the gun. Only such dyes or paints are used for this purpose as may be caused to adhere permanently to or be embedded in the surface of the map or model by the pressure by which they are "shot" against the same. The dye or paint used is selected for its flexible or elastic qualities so as not to render the map material less flexible because of such application thereto.

When the cold mold process is used and a rapid coagulate is used in the latex formula, vulcanization by heat may be dispensed with.

From the foregoing description, taken in connection with the accompanying drawing, it is thought that the advantages of the invention will be clear to those skilled in the art to which it appertains.

This application is a continuation in part of my application Serial No. 58,990, filed January 13, 1936.

What I claim is:

1. The process for the industrial manufacture of maps, charts, etc., in high relief, including the steps of forming in the molding face of a hot female mold the negative of the relief map, etc. to be made, applying over the entire molding face of the mold a thin film of latex compound, allowing the same to solidify, placing in the deep depressions fillers of loose textile fibres, then placing a sheet of textile material in the mold onto the surface of the latex and covering the fillers, and uniting the textile sheet to the latex film.

2. The process for the industrial manufacture of maps, charts, etc., in high relief, including the steps of forming in the molding face of a hot female mold the negative of the relief map, etc. to be made, applying over the entire molding face of the mold a thin film of latex compound, allowing the same to solidify, placing in the deep depressions fillers of loose textile fibres, then placing a sheet of textile material in the mold onto the surface of the latex and covering the fillers, and lightly pressing the textile sheet to the latex film to unite the same.

JOSE ESTEVÃO CACELLA
DE VICTORIA PEREIRA.